United States Patent
Koster et al.

(10) Patent No.: US 10,313,395 B2
(45) Date of Patent: *Jun. 4, 2019

(54) PLACEMENT OF OPERATORS AND ENCRYPTION OF COMMUNICATION BASED ON RISK IN A COMPUTER SYSTEM NODE

(71) Applicant: International Business Machines Corporation, Armonk, NY (US)

(72) Inventors: David M. Koster, Rochester, MN (US); Jason A. Nikolai, Rochester, MN (US); Adam D. Reznechek, Rochester, MN (US); Andrew T. Thorstensen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 154 days.

This patent is subject to a terminal disclaimer.

(21) Appl. No.: 15/382,897

(22) Filed: Dec. 19, 2016

(65) Prior Publication Data

US 2018/0176253 A1    Jun. 21, 2018

(51) Int. Cl.
*H04L 29/00* (2006.01)
*H04L 29/06* (2006.01)
(Continued)

(52) U.S. Cl.
CPC .......... *H04L 63/20* (2013.01); *H04L 63/0428* (2013.01); *H04L 63/0457* (2013.01);
(Continued)

(58) Field of Classification Search
None
See application file for complete search history.

(56) References Cited

U.S. PATENT DOCUMENTS 5,621,889 A   4/1997 Lermuzeaux et al.
6,111,896 A   8/2000 Slattery et al.
(Continued)

OTHER PUBLICATIONS

Koster et al., "Risk-Based Encryption of Communication on a Computer System Node", U.S. Appl. No. 15/355,254, filed Nov. 18, 2016.

(Continued)

*Primary Examiner* — Ghazal B Shehni
(74) *Attorney, Agent, or Firm* — Martin & Associates, LLC; Bret J. Petersen

(57) ABSTRACT

A streams manager assesses the security risk of streaming communication and dynamically migrates operators of a streaming application based on the security risk. The streams manager may also dynamically change encryption of intranode communication between the operators to increase performance of the computer node. The streams manager includes a stream security module (SSM) with a monitor that monitors risk in the system and changes placement of operators and encryption between operators on a node depending on the risk. The stream security module may use security data and node profile data collected by the monitor or the system to determine the risk. The stream security module may provide recommendations to a customer for the customer to override changes in placement and encryption.

20 Claims, 9 Drawing Sheets

(51) Int. Cl.
*H04W 12/02* (2009.01)
*H04L 29/08* (2006.01)

(52) U.S. Cl.
CPC .......... *H04L 63/1425* (2013.01); *H04L 67/10* (2013.01); *H04W 12/02* (2013.01)

(56) References Cited

U.S. PATENT DOCUMENTS

| | | |
|---|---|---|
| 8,135,657 B2 | 3/2012 | Kapoor et al. |
| 9,009,723 B2 | 4/2015 | Degenaro et al. |
| 2011/0238855 A1 | 9/2011 | Korsunsky et al. |
| 2014/0143867 A1* | 5/2014 | Tanizawa .............. H04L 63/065 726/22 |
| 2017/0230402 A1* | 8/2017 | Greenspan .......... H04L 63/1433 |

OTHER PUBLICATIONS

Appendix P—List of IBM Patents or Patent Applications Treated as Related, dated Mar. 1, 2017.
Repantis, Thomas S., Synergy: Quality of Service Support for Distributed Stream Processing Systems. Dissertation, University of California Riverside, Aug. 2008.
Wikipedia, "Transport Layer Security", printed Nov. 14, 2016 from https://en.wikipedia.org/wiki/Transport_Layer_Security.
Wikipedia, "Multilevel security", printed Nov. 14, 2016 from https://en.wikipedia.org/wiki/Multilevel_security.

* cited by examiner

PLACEMENT OF OPERATORS AND ENCRYPTION OF COMMUNICATION BASED ON RISK IN A COMPUTER SYSTEM NODE

BACKGROUND

1. Technical Field

This disclosure generally relates to streaming applications and communication, and more specifically relates to dynamically migrating streaming application operators and dynamically changing encryption of intranode communication of the operators based on security risk.

2. Background Art

Streaming applications are becoming more common due to the high performance that can be achieved from near real-time processing of streaming data. A streaming application is organized as a data flow graph consisting of multiple operators connected via stream connections that each process streaming data in near real-time. An operator typically takes in streaming data in the form of data tuples, operates on the tuples in some fashion, and outputs the processed tuples to the next operator in the flow graph.

The distributed nature of streams processing allows for multiple connections to exist on a single host. Many communication standards have security and privacy regulations that require encryption of streaming data between the operators. Encryption is typically used to encrypt all communication traffic between operators within a node. Encryption of data communication traffic on these multiple connections may adversely affect performance.

BRIEF SUMMARY

A streams manager assesses the security risk of streaming communication and dynamically migrates operators of a streaming application based on the security risk. The streams manager may also dynamically change encryption of intranode communication between the operators to increase performance of the computer node. The streams manager includes a stream security module (SSM) with a monitor that monitors risk in the system and changes placement of operators and encryption between operators on a node depending on the risk. The stream security module may use security data and node profile data collected by the monitor or the system to determine the risk. The stream security module may provide recommendations to a customer for the customer to override changes in placement and encryption.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
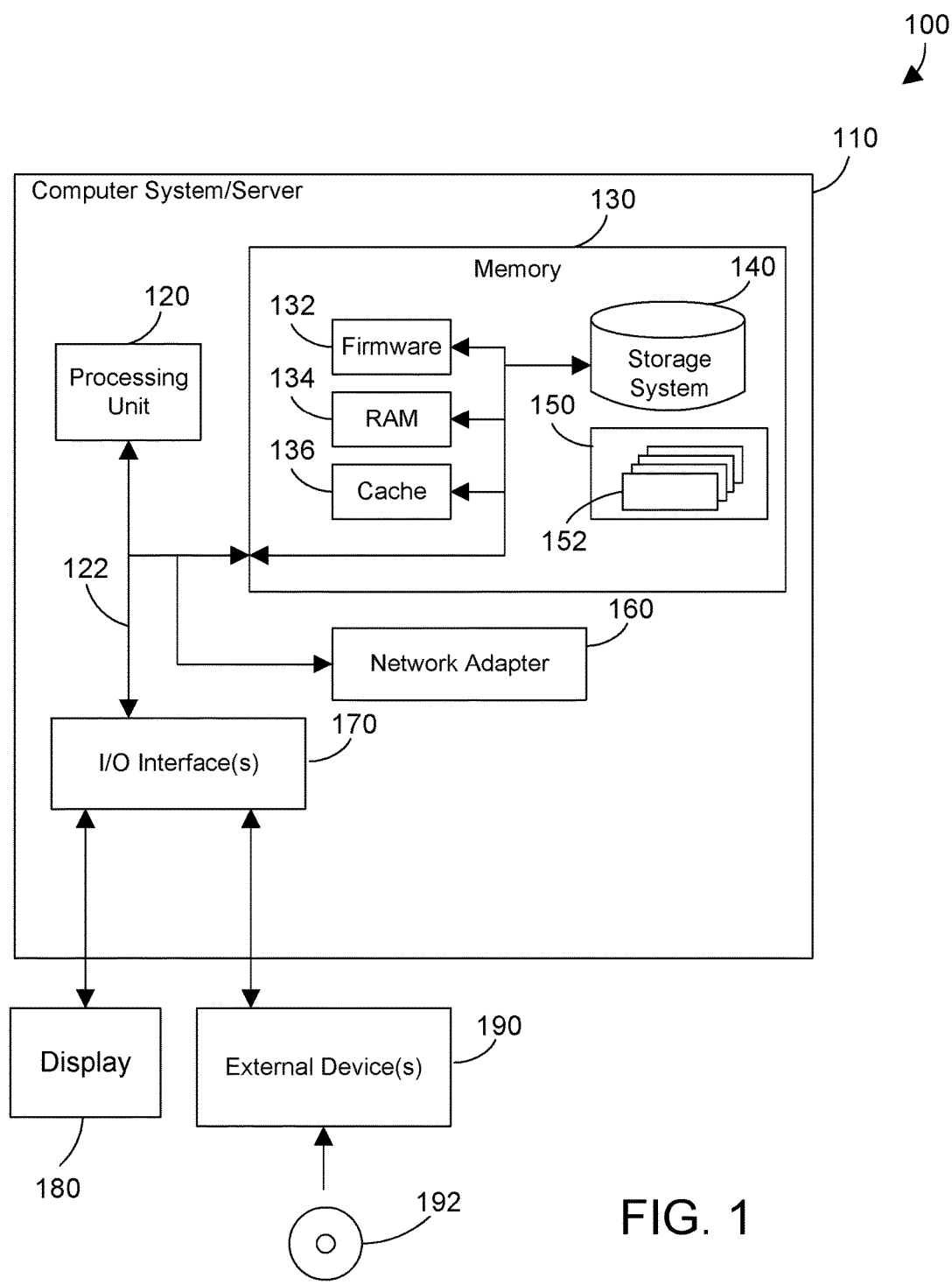
FIG. 1 is a block diagram of a cloud computing node.

The disclosure and claims herein relate to a streams manager that assesses the security risk of streaming communication and dynamically migrates operators of a streaming application based on the security risk. The streams manager may also dynamically change encryption of intranode communication between the operators to increase performance of the computer node. The streams manager includes a stream security module (SSM) with a monitor that monitors risk in the system and changes placement of operators and encryption between operators on a node depending on the risk. The stream security module may use security data and node profile data collected by the monitor or the system to determine the risk. The stream security module may provide recommendations to a customer for the customer to override changes in placement and encryption.

The stream security module described herein can be used with a streaming application executed on a cluster computer or in a cloud based computer system. When the streaming application is executed in a cloud based computer system, security between applications belonging to different customers is a particular concern. A customer's data may be at an increased risk of compromise if the customer's streaming application resides on computer hardware nodes that also host applications belonging to other customers of a service provider. As introduced above, encryption of data communication traffic on multiple connections between nodes of a streaming application may adversely affect performance. The effect on performance will be a consideration in the cost of the service provider to host customer applications. Service providers seek to maximize the performance of a node while maintaining required security of data for their customers. The stream security module described herein is particularly advantageous to balance the considerations of cost and security in a cloud based streaming application.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
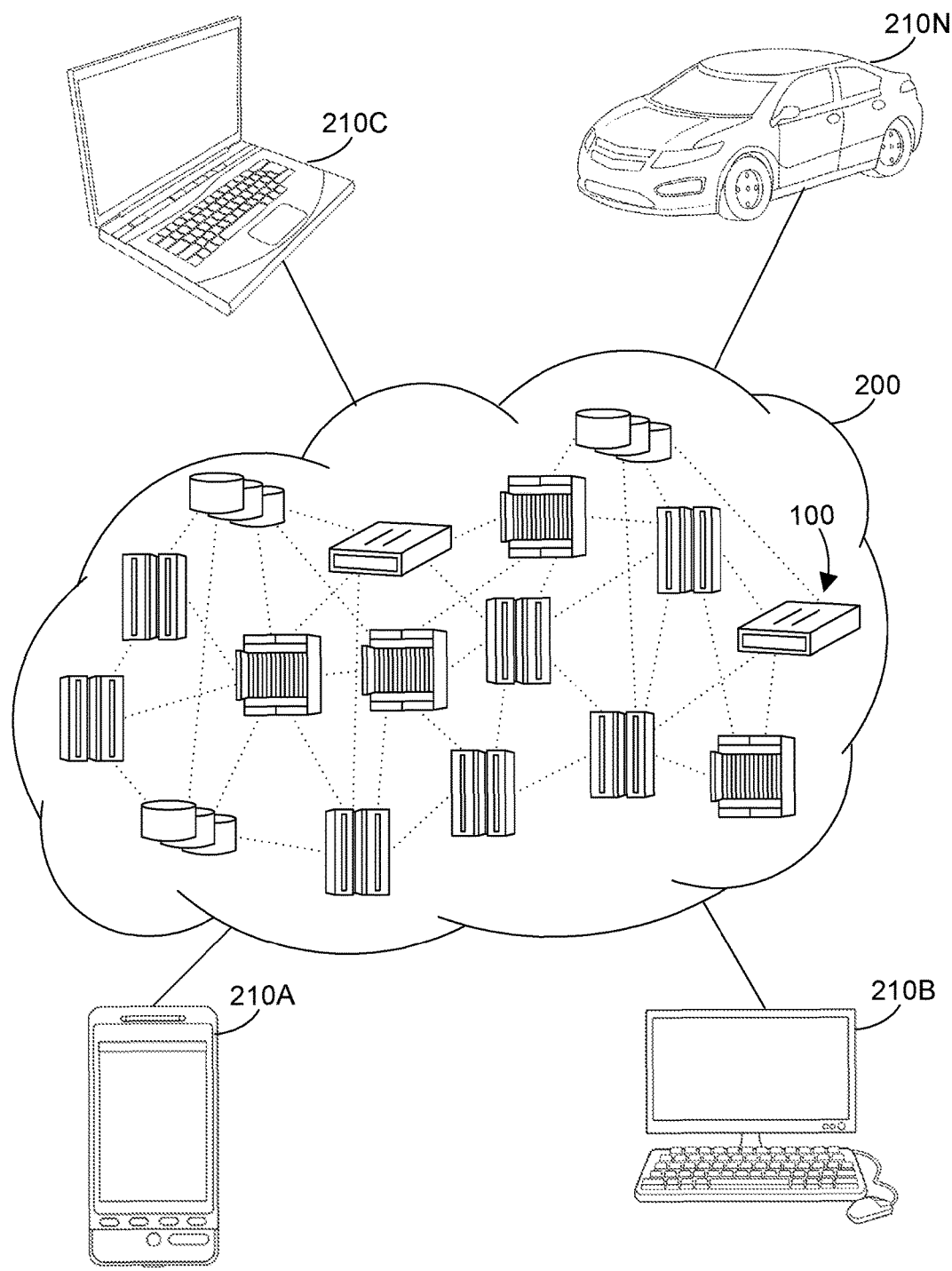
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
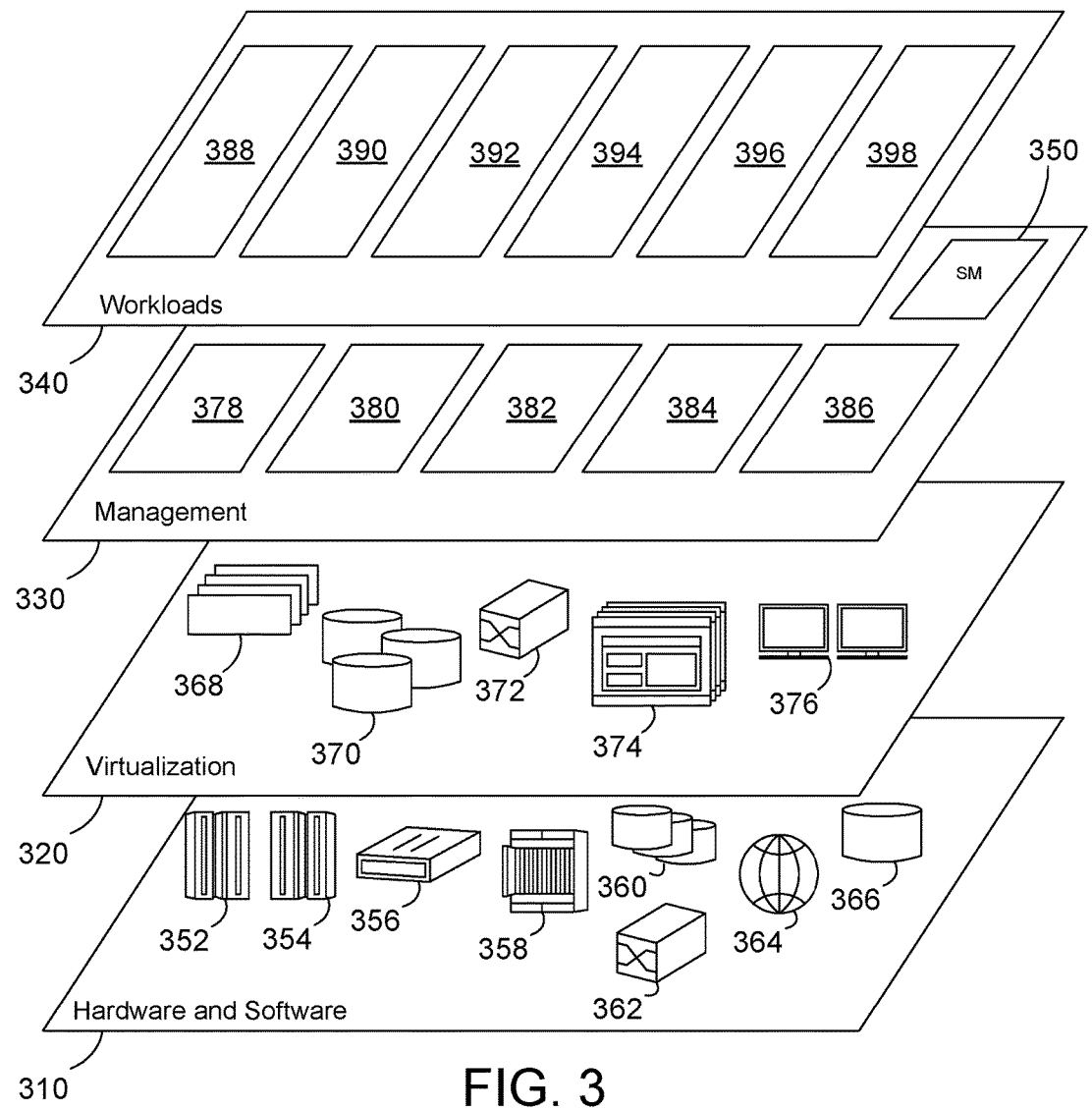
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a streams manager (SM) 350 as described herein. While the SM 350 is shown in FIG. 3 to reside in the management layer 330, the SM 350 actually may span other levels such as the applications layer 340 shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
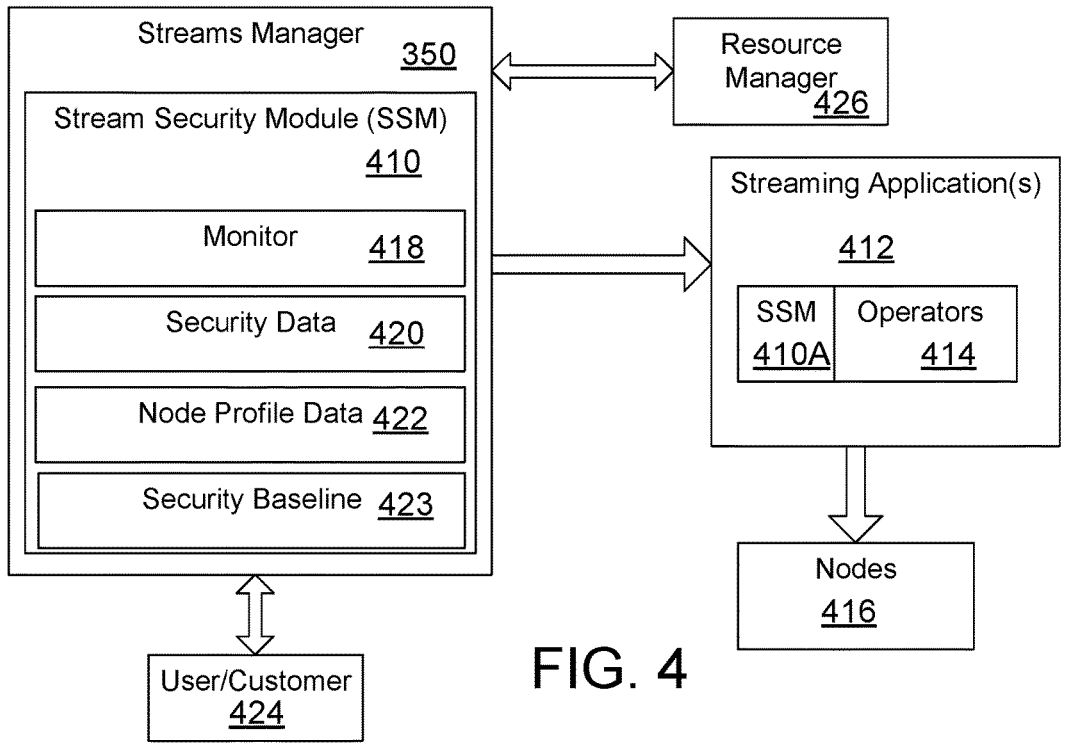
FIG. 4 is a block diagram showing an example of a streams manager that dynamically migrates operators and dynamically changes encryption of intranode communication based on security risk as described herein.

FIG. 4 shows one suitable example of the streams manager 350 introduced in FIG. 3 with a stream security module (SSM) 410 that dynamically migrates operators to change the location of the operators on one or more nodes in the system and dynamically changes encryption of intranode communication based on security risk as described herein. The streams manager 350 is software that manages one or more streaming applications as known in the prior art and may operate similar to prior art streams managers except as described herein. In this simplified example, the streams manager 350 manages streaming application 412. The streaming application 412 may comprise a number of operators 414 that may be represented in the form of a flow graph as known in the prior art. The management of the streaming application(s) 412 includes managing operators 414 and data flow connections between operators 414 when the operators are placed on one or more nodes 416. In the illustrated example, the stream security module (SSM) 410 is shown incorporated into the streams manager 350 but in other examples may be a stand-alone module. Portions of the stream security module SSM 410A may reside in or be attached to an operator 414 as shown.

Again referring to FIG. 4, in the illustrated example, the SSM 410 includes a monitor 412 that monitors performance of the streaming application or applications 412 to provide performance information to the SSM 410 as described further below. The SSM 410 further includes security data 420 and node profile data 422. The security data 420 includes information about users, devices, processes, capabilities, data rates and operating systems as described further below with reference to FIG. 6A. The node profile data 422 provides information about the nodes to the SSM 410 which includes virtualization technology, block devices and user permissions as described further below with reference to FIG. 6B. In some examples of the invention, a user or customer 424 may provide input to the streams manager as described herein. The SSM 410 may communicate with a resource manager 426. The resource manager 426 manages system resources as known in the prior art. The SSM 410 may request the resource manager 426 to allocate additional nodes for placing operators of the streaming application as described further below. The resource manager 426 could be a local resource manager, or could be a cloud-based resource manager. The SSM 410 may further include a security baseline 423 as described further below.

As discussed above, the stream security module (SSM) 410 includes a monitor 418 to monitor the security data 420, the node profile data 422, and changes in nodes 416 and the operators 414 of the streaming application 412 to access the risk of communication for the streaming application 412. With respect to the functions described in this application, the monitor 418 includes monitoring the status of the streaming application's operators and monitoring addition of operators to a node or host. Monitoring of the operators can be done in various ways as known in the prior art.

Figure 5A:
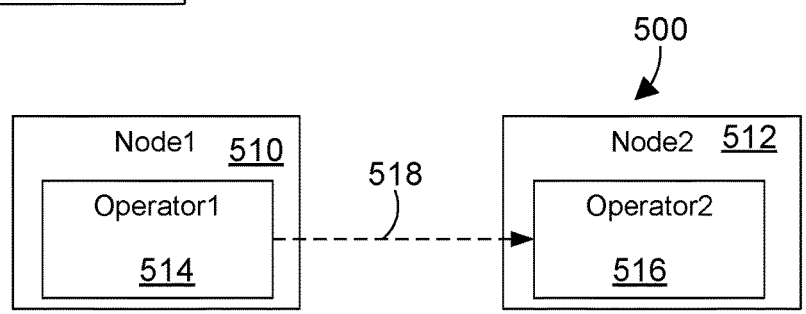
FIG. 5A illustrates a simplified block diagram of intranode communication between operators of a streaming application.
Figure 5B:
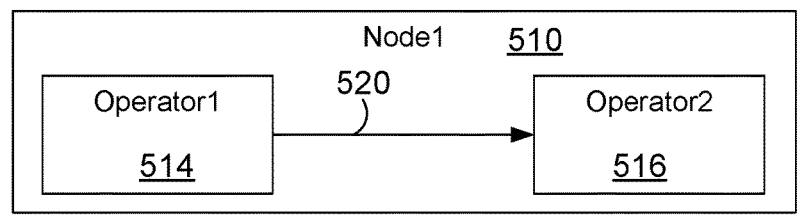
FIG. 5B illustrates a simplified block diagram of intranode communication between operators of a streaming application.

FIG. 5A illustrates a simplified block diagram of internode communication between operators of a streaming application. A first node, node1 510 hosts operator1 514 and a second node, node2 512 hosts operator2 516. Communication 518 supported by the streams manager between operator1 514 and operator2 516 is internode communication because the operators are hosted on different nodes. Internode communication 518 could be encrypted as is common in the prior art (as indicated by the dashed line) for security. FIG. 5B illustrates a simplified block diagram of intranode communication between operators of a streaming application. In this example, a first node, node1 510 hosts operator1 514 and also hosts operator2 516. Communication supported by the streams manager between operator1 514 and operator2 516 is intranode communication where the operators are hosted on the same node. Intranode communication 520 is most often encrypted. However, this communication can often be unencrypted (as indicated by the solid line) when the security risk is sufficiently low to increase performance by eliminating the overhead of encrypting intranode communication as described herein.

Figure 6A:
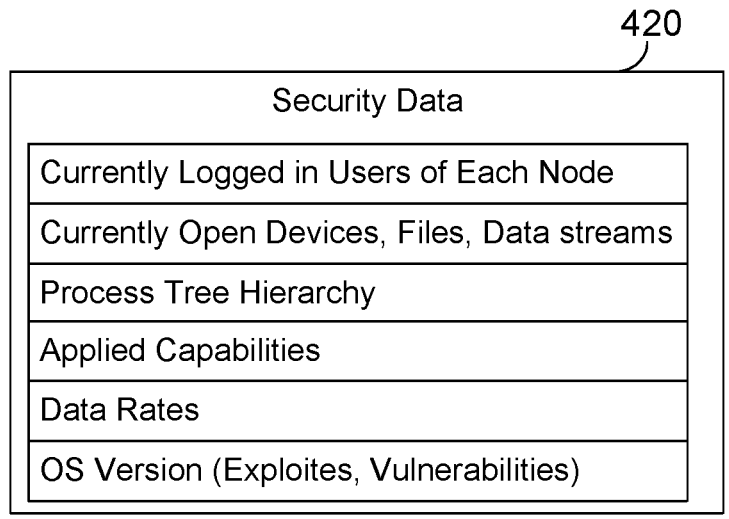
FIG. 6A illustrates an example of a security data block introduced in FIG. 4.

FIG. 6A illustrates an example of security data 420 introduced in FIG. 4. The security data 420 includes various information about users, devices and processes that can be used to assess the security of intranode communication. In the illustrated example, security data 410 includes the currently logged in users of each node, the currently open devices, files and data streams, the process tree hierarchy, applied capabilities, data rates, and the operating system (OS) version. The list of logged in users on each node can be used to monitor when new users come on to the system and leave the system. Different users may have different risk profiles that can be taken into consideration for the overall risk of unencrypted intranode communication. Similarly, open devices, files and data streams can be used to access risk to specific customer data. A weighted risk value for each of these data items could be produced based on user defined weights and the total compared to a risk threshold. If the weighted risk is below the threshold, then the intranode communication can be unencrypted as described herein.

Again referring to FIG. 6A, the security data 420 also includes process tree hierarchy. In Linux, any program can "fork" or create a child process. This child process will automatically take the security permissions of its parent without going through the same security channels a completely new unprivileged process would have to go through. Thus, it's very important to look at the process tree (parent child relationships) to see which have special security rights, and those that may have obtained them by being the child of a process that did have security rights. Furthermore, since child processes are created by a parent, they often have communication between the two and we may deem an unprivileged child that communicates with a privileged parent to be as dangerous as a privileged child because it could be delegating work to the parent that the system is not aware of Thus, the process tree hierarchy can be used to monitor communication risk of work delegated to other processes.

The security data 420 introduced in FIG. 4 also may include applied capabilities. Many programs need special security rights, either to directly access hardware, clean up files from other programs, any number of reasons. Often times, if the user is executing these programs the system will run them as an administrator via a sudo command. A sudo command is a command in Linux type operating system that allows a user to run programs with the security privileges of another user or a superuser. For security, a continuous running program is only given administrator rights when the program is specifically designed to have these types of rights. For example, a process may be allowed to delete all files but not allowed to access the network adapter. The system can set applied capabilities that basically allow the program to have administrator rights to only that specific function. Sticky capabilities are rights that remain even after the user of a process changes. A security system for streaming applications may seek to minimize the amount of time a user spends with unnecessary privileges. The SSM may monitor sticky capabilities to access security risk. For example, the SSM may monitor when rights have been lost by a process and thus may no longer pose a security risk.

The security data 420 introduced in FIG. 4 may also include data rates. If a process is capturing encrypted data and trying to use it to determine encryption keys, the more data the process has the easier the process can break the encryption. Thus, high data rates, if using flawed or backdoored encryption techniques (which the system may not know about at the time) give an attacker an edge. The system may alert a user or administrator of an increased security risk when increased data rates are detected. The items listed in security data 420 are given as examples. The security data 420 may further include an identification of the operating system (OS) version used on the node. Any known vulnerabilities of the operating system used on the node can be considered for the risk profile. Other data could also be used that is relevant to the security of communication or risk in a streaming application.

Figure 6B:
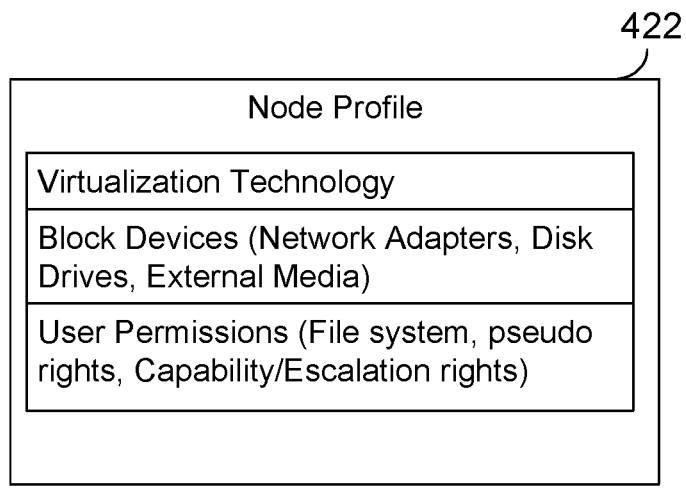
FIG. 6B illustrates an example of node profile data introduced in FIG. 4.

FIG. 6B illustrates an example of node profile data 422 introduced in FIG. 4. The node profile data 422 provides information about the nodes to the SSM 410 which includes virtualization technology, block devices and user permissions. The virtualization technology can be used to assess risk. In virtual machines the program can never see the real, physical network adapter unless the virtualization explicitly allows it. Thus, virtualization provides protection to the underlying hardware from other software. Containers are the least secure virtualization, often only overlaying network adapters and file system and sharing the same kernel. The risk of a fully privileged user running in a full virtual machine is not a threat to the system compared to that same user on a system with no virtualization.

The node profile data 422 shown in FIG. 6B may also include block devices. Block devices are essentially anything that can store or send data. They include hard drives, network adapters, etc. When a process sends data to a block device, it may be difficult or impossible to tell what, if any permission rules that device has, so a block device is generally treated as an uncontrolled access point and it represents a fairly high risk for any data that flows through it. This is why encryption is generally always used between machines, because the network card and the network itself are uncontrolled.

The node profile data 422 shown in FIG. 6B may also include information about user permissions to determine if there is a high-risk situation on the nodes. It is also important to look at escalation rights of the users. A user may appear to have no rights upon logging in, but if they are capable of escalating to another user profile or root they may suddenly have access to resources previously outside their grasp. Thus, it is important to not only check which users are authorized to access data, but also who is authorized to escalate operations, and which operations they may escalate.

Figure 7A:
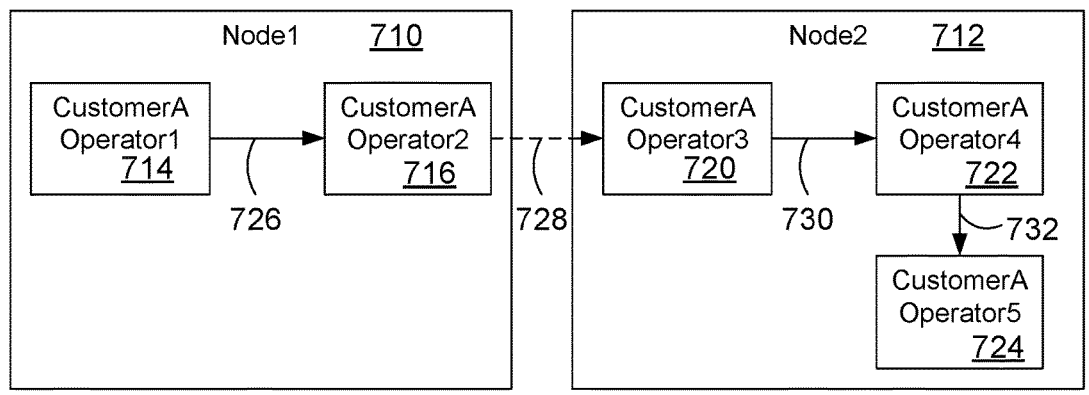
FIGS. 7A-7C illustrate simplified examples for dynamically migrating operators and dynamically changing encryption of intranode communication based on security risk.
Figure 7B:
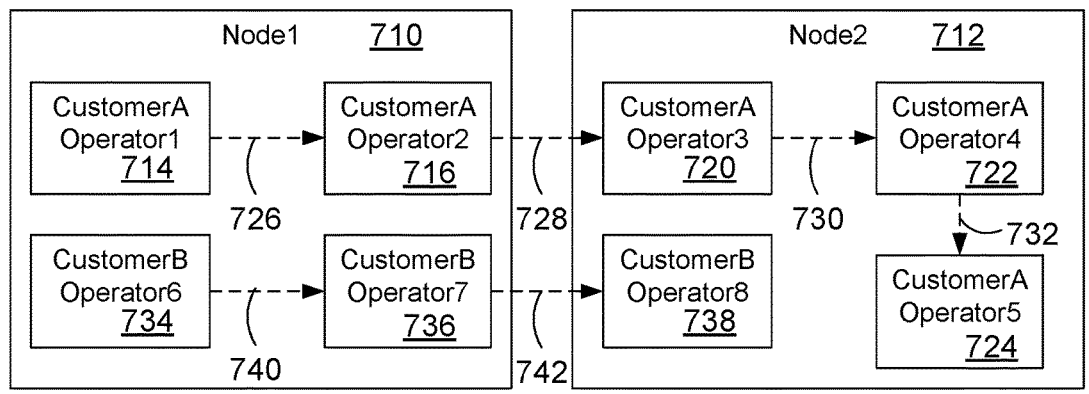
Figure 7C:
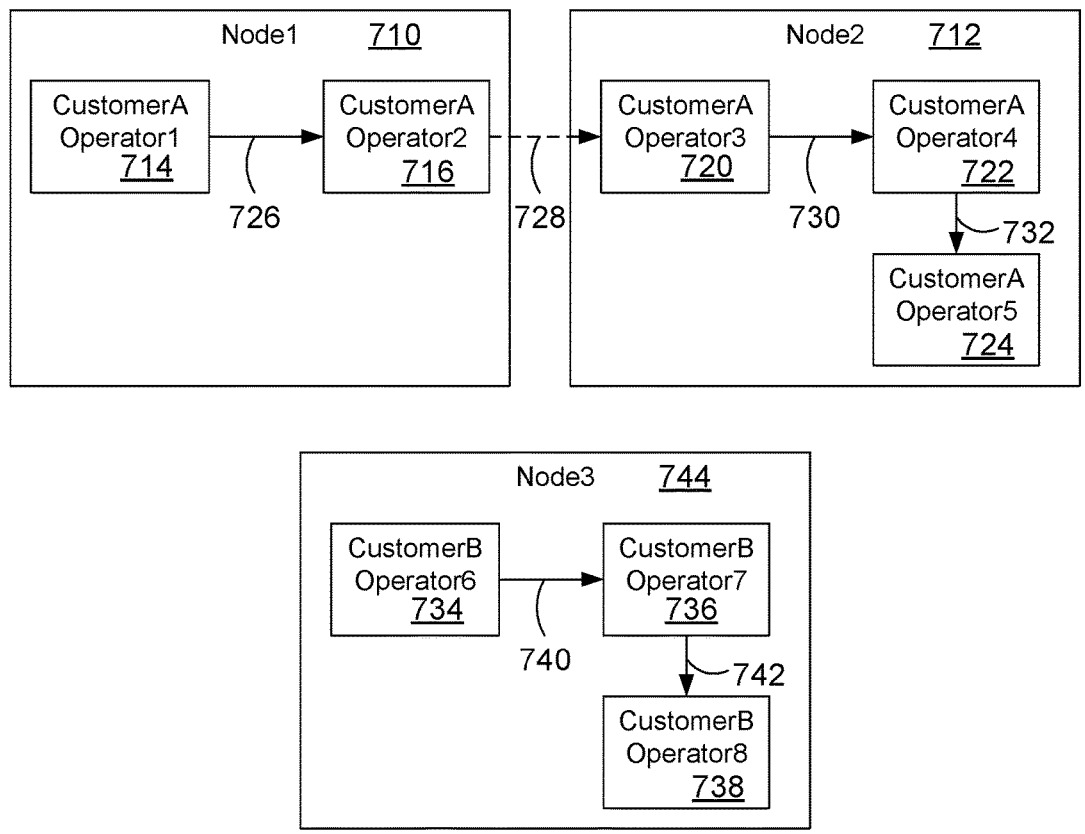

FIGS. 7A-7C illustrate a series of simplified examples of dynamically migrating operators and changing the encryption of intranode communication based on security risk. Initially node1 710 and node2 712 are loaded with operators of a streaming application belonging to customerA as shown in FIG. 7A. The streaming application includes operator1 714 which streams data to operator2 716, operator3 720, operator4 722 and operator5 724. The stream security module (SSM) 410 (FIG. 4) monitors the nodes to detect changes and uses the security data 420 and the node profile 422 to determine risk on the node. The SSM may provide recommendations to a customer for a customer override as described further below. In this example, the SSM 410 determines that the risk on node1 710 is sufficiently low to unencrypt the intranode communication 726, 730, 732 between the operators as indicated by the solid lines representing the communication.

FIG. 7B illustrates another example of dynamically migrating operators and changing the encryption of intranode communication based on security risk. FIG. 7B shows node1 710 and node2 712 introduced in FIG. 7A after adding a streaming application for a second customer. Operator6 734 and operator7 736 of customerB are placed on node1 710 as shown. Also, operator8 738 of customerB are placed on node2 712. While monitoring the system, the SSM 410 detects this change and analyzes the risk in a similar manner as before. In this example, the SSM 410 determines the risk on the system having both customerA and customerB is sufficiently high to recommend migration of the operators of one customer or encryption of data between operators of both customers. In response to the increased risk, the SSM 410 may determine to first migrate operators or first encrypt communication. For example, if migration of the operators is pursued immediately, then the SSM 410 may migrate the operators as shown in FIG. 7C and described below. Alternatively, the SSM 410 may first encrypt intranode communication in response to the increased risk. FIG. 7B illustrates changing the encryption of data communication in response to the increased risk. In this example, intranode communication 726, 730, 732, and 740 between operators are encrypted as indicated by the dotted line between the operators. Streaming data communication on link 728 between operator2 716 and operator3 720 and on link 742 between operator7 736 and operator8 738 is encrypted in the usual manner for internode communication as indicated by the dotted lines at 728 and 742. After changing the encryption, the SSM 410 may determine to migrate the operators as described with reference to FIG. 7C.

FIG. 7C illustrates an example of dynamically migrating operators of a streaming application based on security risk. In this example, the SSM 410 has acquired additional resources represented by node3 744. The SSM 410 may request the additional resources or node by a request to a resource manager 426 (FIG. 4) in a manner as known in the prior art. The SSM 410 may then initiate migrating the operators of customerB to the newly acquired node. FIG. 7C shows node1 710 and node2 712 as introduced in FIG. 7B after operator6 734, operator7 736 and operator8 738 of the streaming application for customerB has been migrated to node3 744. After the migration, the SSM 410 again monitors the risk. The SSM 410 may then encrypt intranode communication where needed because the security risk is high and unencrypt intranode communication where the security risk is low. In this example, the SSM 410 determines the risk on the nodes is sufficiently low to recommend returning to unencrypted streaming of intra node communication. FIG. 7C thus shows unencrypted intranode communication 726, 730, 732 between the operators of customerA and unencrypted communication 740, 742 between operators of customerB as indicated by the solid lines between the operators.

As described in the above examples, when the SSM 410 determines a sufficient change in risk on a node, such as a risk above or below a determined threshold, the SSM 410 may determine to change encryption between operators in the system. The SSM may also provide this determination of risk as a recommendation to the customer, as represented at 424 in FIG. 4. The customer may then be given the opportunity to override the normal encryption or non-encryption of communication for the determined level of risk. The SSM 410 may then send instructions to the streams manager 350 to change the encryption as appropriate for the change in risk and where overridden, as indicated by the customer override.

In the above examples, the SSM 410 monitored the system and when changes were detected the SSM determined how risk of communication between operators was affected by the system changes. To determine the changes in risk, the SSM 410 may compare a current risk profile for the system with a security baseline 423 that was previously determined and stored as shown in FIG. 4. The security baseline 423 may include scoring the risk parameters described in the security data 420 and the node profile data 422. Then when changes are detected in the system, a new risk profile can be scored and compared to the security baseline 423 that was previously stored. In particular, the security baseline may include the regularly logged in users of a node and the CPU, memory, and network utilization of a node. The security baseline 423 may also include the normally established network channels to other nodes. This may help identify a new or strange operator that may pose a risk. The security baseline 423 could include a list of the current OS and all software packages and all known vulnerabilities against those packages. The security baseline 423 could also include a list of all users that might escalate an operation to administrator levels (via admin login or sudo). As discussed above, the user/customer may be allowed to weight each of these parameters to produce a weighted risk value, which may take into consideration a specific system deployment.

In another example, upon detecting a risk situation, the SSM 410 may send an alert to a system administrator. This may be helpful for high risk situations that are not simply solved by encrypting data streams. For example, if a high risk situation is detected, the customer may use the override to not encrypt intranode data streams, the SSM 410 may then alert the system administrator.

In another example, upon detecting a risk situation, the SSM 410 may take precautions to avoid escalating the risk profile. These precautions may include an application or operator of an application making changes to the system to avoid a higher risk. An example of this can be described with reference to FIGS. 7A and 7B. Suppose the operators of customerA in FIG. 7A want full ownership of a network adapter. Since there are no other operators on the system, these operators can claim sole use of the network adapter. However, when another customer joins the node as shown in FIG. 7B, the original operators would no longer have sole use of the network adapter. Therefore, in order to not escalate risk of compromised data, the operators of customerA could take actions to set capabilities such as claiming the entire network adapter and forcing the new operators joining the node (734, 736 and 738) to use a different adapter. This action may leave the system at the same risk level, but shows how the system may mitigate a change in state.

In another example, the SSM 410 may identify an increased risk and determine to dynamically migrate operators to another location on the nodes where the increased risk is determined by detecting a usage anomaly. A usage anomaly may include a data flood or significant increase in data into a node. For example, the SSM 410 may detect a large amount of incoming data into a node that is large enough to cause resource problems (CPU, memory, network bandwidth, etc.). This flood of data may be caused by a malicious attack to the system such as a distributed denial of service attack. Often large floods of data are used to make a program crash and dump its memory which may leak confidential data. To avoid this type of situation, the SSM 410 may change encryption between nodes so that if a program unexpectedly dumps memory it will not risk exposure of customer data. This also allows the system to safely function during a network attack anomaly.

Figure 8:
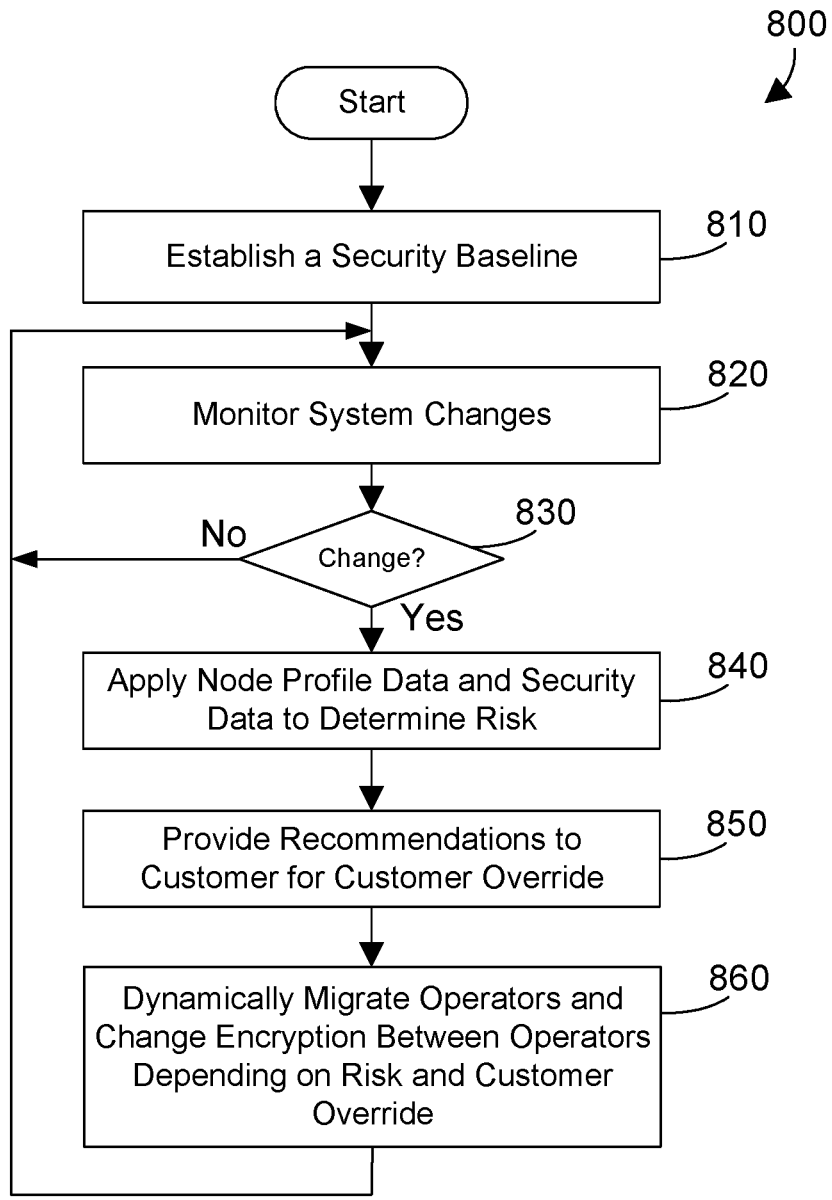
FIG. 8 is a flow diagram of a method for a streams manager to dynamically migrate operators and dynamically changes encryption of intranode communication based on security risk.

Referring to FIG. 8, a method 800 shows one suitable example for dynamically migrating streaming application operators and dynamically changing encryption of intranode communication based on security risk. Method 800 is preferably performed by the stream security module 410 in the streams manager 350 as shown in FIG. 4. First, establish a security baseline (step 810). Then monitor system changes (step 820) to detect changes in risk (step 830). If there are no changes in risk (step 830=no) then return to step 820. When there are changes to the system that affect risk (step 830=yes) then apply the node profile and security data to determine risk (step 840). Then provide recommendations to a customer for customer override (step 850). Then dynamically migrate operators to nodes of the system and optionally dynamically change encryption of communication between operators depending on risk and the customer override (step 860). The method is then done.

Figure 9:
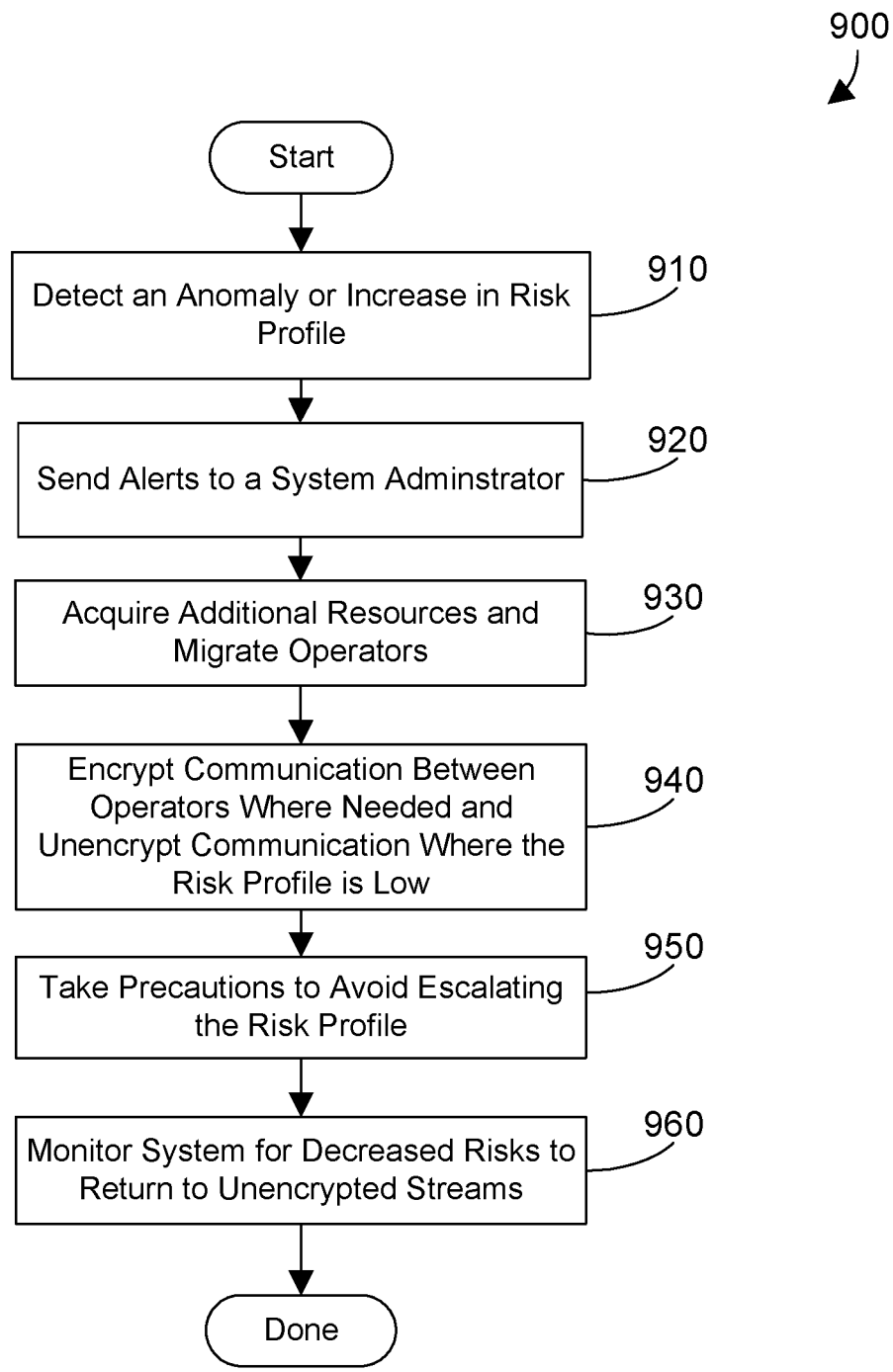
FIG. 9 is a flow diagram of a specific method for step 840 in FIG. 8.

FIG. 9 shows one suitable example of a method that dynamically migrates operators and dynamically changes the encryption of intranode communication based on security risk. Method 900 thus shows suitable steps for performing step 860 in method 800. Step 860 in FIG. 8 may include one or more of the steps shown in method 900. First, detect an anomaly or an increase in risk profile (step 910). Send an alert to a system administrator (step 920). Acquire additional resources and migrate operators to new nodes (step 930). Optionally, encrypt communications between operators where needed and unencrypt communication between operators when the risk profile is low (step 940). Take precautions to avoid escalating the risk profile (step 950). Monitor the system for decreased risks on the nodes and return data communication streams that have been encrypted to unencrypted streams (step 960). Then the method is then done.

The disclosure and claims herein describe a streams manager that assesses the security risk of intranode communication between operators of a streaming application and migrates operators and adjusts the communication to encrypt or not encrypt the communication according to risk on the node. When the risk is sufficiently low, the intranode communication is unencrypted to increase performance of the node.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a streams manager residing in the memory and executed by the at least one processor that manages a plurality of streaming applications on a plurality of computer nodes, wherein the plurality of streaming applications comprise a plurality of operators that communicate streaming data between the plurality of operators; and
a stream security module residing in the memory and executed by the at least one processor, wherein the stream security module monitors changes to the plurality of nodes to determine a security risk of communication between two operators of the plurality of operators on a single node, and when an increase in the security risk is detected, in response to the increase in security risk the stream security module acquires additional resources and dynamically migrates at least one operator from the single node to a different node to reduce the security risk of communication between the two operators.

2. The apparatus of claim 1 wherein the stream security module in response to the reduction in security risk changes a communication link that provides intranode communication between the two operators that was encrypted to be unencrypted.

3. The apparatus of claim 1 wherein the stream security module establishes a security baseline for streaming communication on the plurality of nodes.

4. The apparatus of claim 1 wherein the stream security module applies node profile data and security data to a determined change in the plurality of nodes to determine the security risk and wherein the node profile data comprises virtualization technology, block devices, and user permissions.

5. The apparatus of claim 4 wherein the security data comprises logged in users of each node, currently open devices, process tree hierarchy, applied capabilities, data rates and operating system version.

6. The apparatus of claim 1 wherein the stream security module provides a recommendation to a customer and allows the customer to override encryption of a data communication stream.

7. The apparatus of claim 1 wherein the streams security module encrypts intranode data stream when a usage anomaly of an operator is detected.

8. The apparatus of claim 7 wherein the streams security module sends an alert to a system administrator when the usage anomaly is detected.

9. The apparatus of claim 1 wherein the streams security module further monitors the nodes for decreased risks and changes a communication link that provides intranode communication that has been encrypted to be unencrypted.

10. A computer-implemented method executed by at least one processor for managing a streaming application, the method comprising:
    managing a plurality of streaming applications on a plurality of computer nodes, wherein the plurality of streaming applications comprise a plurality of operators that communicate streaming data between the plurality of operators;
    monitoring changes to the plurality of nodes to determine a security risk of communication between two operators of the plurality of operators on a single node of the plurality of nodes;
    in response to an increased security risk, acquiring additional resources; and
    dynamically migrating at least one operator from the single node to a different node to reduce the security risk of communication between the two operators on the single node.

11. The method of claim 10 further comprising dynamically changing encryption of streaming data between the two operators on the single node of the plurality of nodes based on the security risk.

12. The method of claim 10 further comprising establishing a security baseline for streaming communication on the plurality of nodes.

13. The method of claim 10 further comprising applying node profile data and security data to a determined change in the plurality of nodes to determine the security risk and wherein the node profile data comprises virtualization technology, block devices, and user permissions.

14. The method of claim 13 wherein the security data comprises logged in users of each node, currently open devices, process tree hierarchy, applied capabilities, data rates and operating system version.

15. The method of claim 10 further comprising providing a recommendation to a customer and allowing the customer to override encryption of a data communication stream.

16. The method of claim 10 further comprising encrypting an intranode data stream when a usage anomaly of an operator is detected.

17. The method of claim 16 further comprising sending an alert to a system administrator when the usage anomaly is detected.

18. The method of claim 10 further comprising monitoring the nodes for decreased risks and changing a communication link that provides intranode communication that has been encrypted to use unencrypted communication.

19. A computer-implemented method executed by at least one processor for managing a streaming application, the method comprising:
    managing a plurality of streaming applications on a plurality of computer nodes, wherein the plurality of streaming applications each comprise a plurality of operators that communicate streaming data between the plurality of operators;
    establishing a security baseline for streaming communication on the plurality of nodes;
    applying node profile data and security data to a determined change in the plurality of nodes to determine the security risk;
    monitoring changes to the plurality of nodes to determine a security risk of communication between two operators of the plurality of operators on a single node of the plurality of nodes;
    in response to an increased security risk, providing a recommendation based on the security risk to a customer and allowing the customer to override encryption of a data communication stream;
    acquiring additional resources;
    dynamically migrating at least one operator from the single node to a different node to reduce the security risk of communication between the two operators on the single node;
    dynamically changing encryption of streaming data between the operators on a node of the plurality of nodes based on the security risk and a customer override from the customer; and
    monitoring the nodes for decreased risks and changing a communication link that provides intranode communication that has been encrypted to use unencrypted communication.

20. The method of claim 19 further comprising sending an alert to a system administrator when a usage anomaly of an operator is detected.

* * * * *